(12) United States Patent
Hino et al.

(10) Patent No.: US 11,283,277 B2
(45) Date of Patent: Mar. 22, 2022

(54) BATTERY SYSTEM

(71) Applicant: Panasonic Intellectual Property Management Co., Ltd., Osaka (JP)

(72) Inventors: Shintaro Hino, Hyogo (JP); Masaki Kato, Osaka (JP); Etsushi Aga, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 16/634,876

(22) PCT Filed: Sep. 18, 2018

(86) PCT No.: PCT/JP2018/034427
§ 371 (c)(1),
(2) Date: Jan. 28, 2020

(87) PCT Pub. No.: WO2019/073757
PCT Pub. Date: Apr. 18, 2019

(65) Prior Publication Data
US 2020/0235587 A1      Jul. 23, 2020

(30) Foreign Application Priority Data
Oct. 13, 2017   (JP) .............................. JP2017-199781

(51) Int. Cl.
*H02J 7/00* (2006.01)
*H01M 10/42* (2006.01)
*H01M 10/44* (2006.01)

(52) U.S. Cl.
CPC ........... *H02J 7/007* (2013.01); *H01M 10/425* (2013.01); *H01M 10/44* (2013.01); *H02J 7/0013* (2013.01);

(Continued)

(58) Field of Classification Search
USPC .......................................................... 320/118
See application file for complete search history.

(56) References Cited

U.S. PATENT DOCUMENTS

| | | | |
|---|---|---|---|
| 2009/0267409 A1 | 10/2009 | Shima et al. | |
| 2015/0155722 A1* | 6/2015 | Kudo | H02J 7/0016 320/116 |
| 2017/0279161 A1* | 9/2017 | Kamikawa | H01M 50/20 |

FOREIGN PATENT DOCUMENTS

| | | |
|---|---|---|
| JP | 2010-203848 | 9/2010 |
| JP | 2011-250683 | 12/2011 |

(Continued)

OTHER PUBLICATIONS

International Search Report of PCT application No. PCT/JP2018/034427 dated Dec. 11, 2018.

*Primary Examiner* — Bryce M Aisaka
(74) *Attorney, Agent, or Firm* — McDermott Will & Emery LLP

(57) ABSTRACT

In each of battery modules, a processing circuit manages a battery unit connected to a power line. A communication circuit communicates data to be transmitted or received by the processing circuit. An isolated circuit insulates in a direct current between a first terminal of the communication circuit and a positive-electrode terminal or a negative-electrode terminal of the battery unit, and between a second terminal of the communication circuit and a conductive body to be a common potential of a plurality of the battery modules except for the power line.

5 Claims, 5 Drawing Sheets

(52) U.S. Cl.
CPC ............... *H01M 2010/4271* (2013.01); *H01M 2010/4278* (2013.01)

(56) References Cited

FOREIGN PATENT DOCUMENTS

| | | |
|---|---|---|
| JP | 2012-054034 | 3/2012 |
| JP | 2012-205061 | 10/2012 |
| WO | 2008/041393 | 4/2008 |
| WO | 2016/121150 | 8/2016 |

* cited by examiner

BATTERY SYSTEM

TECHNICAL FIELD

The present invention relates to a battery system including a plurality of battery modules connected together.

BACKGROUND ART

Recently, battery systems have been widespread and are used for peak shift, backup, frequency regulation (FR), and other purposes. For higher voltages, battery systems often include a plurality of battery modules connected in series. As of 2017, communication between the battery modules are often conducted using a communication method conforming to standards of RS-485, controller area network (CAN), or Ethernet (registered trademark), for example.

The battery modules are generally connected together by a communication cable. However, a number of wire harnesses increases. The battery modules may be wirelessly connected together. However, influence of noise becomes larger. Thus, using power line communication (PLC) is conceivable.

As a circuit configuration of power line communication in a battery system, the following circuit configurations are conceivable, for example. As a first circuit configuration, both ends of a PLC circuit may be respectively connected to a positive-electrode terminal and a negative-electrode terminal of a battery module via an isolated circuit such as a pulse transformer or a coupler (for example, see PTL 1). As a second circuit configuration, a current transformer (CT) may be attached on a power line to cause electromagnetic induction to couple a PLC circuit with the power line (for example, see PTLs 2, 3).

CITATION LIST

Patent Literature

PTL 1: Unexamined Japanese Patent Publication No. 2011-250683
PTL 2: Unexamined Japanese Patent Publication No. 2012-205061
PTL 3: WO 2016/121150 A

SUMMARY OF THE INVENTION

In the above-mentioned first circuit configuration, when the battery module has low impedance, a communication signal superimposed on the power line largely attenuates and reliability of the communication signal decreases. In the second circuit configuration, when inductive coupling is used on the power line with large current flowing, the CT requires a larger core and the cost increases. An installation space also increases.

The present invention is made in light of such circumstances, and an object of the present invention is to provide a technique for achieving power line communication at low cost with high reliability in a battery system.

To solve the above-mentioned problems, a battery system of a mode of the present invention is a battery system including a plurality of battery modules, wherein each of the battery modules includes a battery unit connected to a power line, a processing circuit configured to manage the battery unit, a communication circuit configured to communicate data to be transmitted or received by the processing circuit, and an isolated circuit configured to insulate in a direct current between a first terminal of the communication circuit and a positive-electrode terminal or a negative-electrode terminal of the battery unit, and between a second terminal of the communication circuit and a conductive body to be a common potential of the plurality of battery modules except for the power line.

According to the present invention, power line communication at low cost with high reliability can be achieved in a battery system.

DESCRIPTION OF EMBODIMENT

Figure 1:
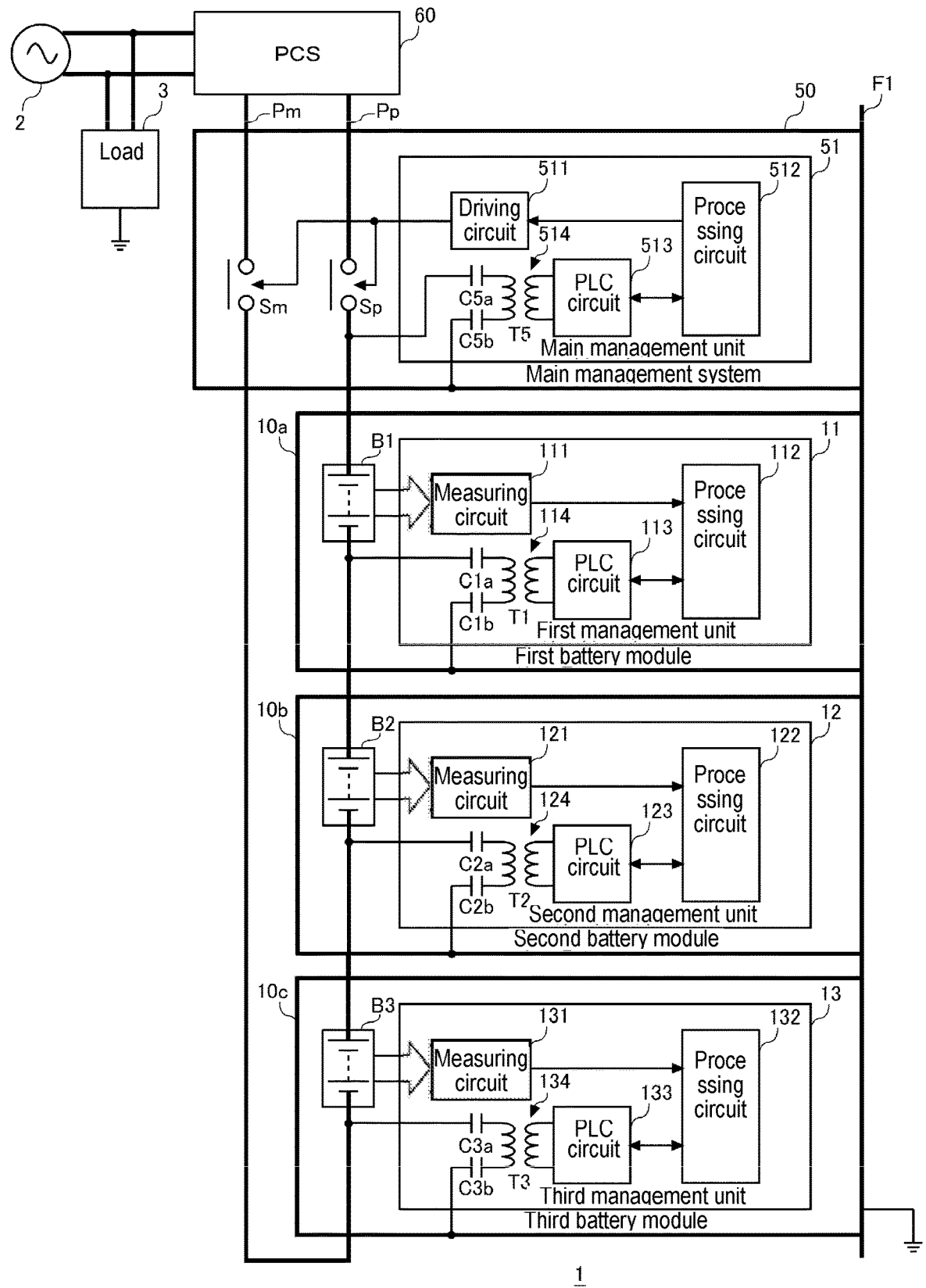
FIG. 1 is a view of a circuit configuration example of a battery system according to an exemplary embodiment of the present invention.

FIG. 1 is a view of a circuit configuration example of battery system 1 according to an exemplary embodiment of the present invention. Load 3 is connected to a distribution line linking battery system 1 with commercial power system 2 (power grid) (hereinafter, referred to as power system 2). Battery system 1 includes a plurality of battery modules 10a to 10c, main management system 50, and power conditioner system 60. FIG. 1 shows an example of using three battery modules 10a to 10c (first battery module 10a, second battery module 10b, and third battery module 10c) connected in series. Note that a number of series connections of battery modules is an example, and not limited to three.

Power conditioner system 60 convers direct current (DC) power discharged from the plurality of battery modules 10a to 10c into alternating current (AC) power to output the power to power system 2 or load 3, and converts AC power input from power system 2 into DC power to charge the plurality of battery modules 10a to 10c. Power conditioner system 60 includes a bidirectional DC/DC converter, a bidirectional inverter, and a controlling circuit.

The bidirectional DC/DC converter can control a current and a voltage of DC power charged to or discharged from the plurality of battery modules 10a to 10c, and enables constant current (CC)/constant voltage (CV) charging and CC/CV discharging, for example. The bidirectional inverter executes the conversion from DC power into AC power or the conversion from AC power into DC power. The controlling circuit controls the bidirectional DC/DC converter and the bidirectional inverter in accordance with instructions from main management system 50. The bidirectional DC/DC converter is optional. When the bidirectional DC/DC converter is omitted, the bidirectional inverter also controls a current and a voltage.

First battery module 10a includes first battery unit B1 and first management unit 11. First battery unit B1 includes a plurality of cells connected in series or in series parallel. Examples of the cells may include lithium ion battery cells, nickel metal hydride battery cells, and lead battery cells. It is assumed hereinafter that lithium ion battery cells are used as the cells, for example.

First management unit 11 includes first measuring circuit 111, first processing circuit 112, first PLC circuit 113, and first isolated circuit 114. In the present exemplary embodiment, first measuring circuit 111, first processing circuit 112, first PLC circuit 113, and first isolated circuit 114 are mounted on one substrate.

First measuring circuit 111 measures a voltage, a current, and a temperature of each cell included in first battery unit B1 to output the measurements to first processing circuit 112. First measuring circuit 111 is configured with an Application Specific Integrated Circuit (ASIC), for example.

First PLC circuit 113 is a PLC modem that executes high-speed PLC communication using a band of 2 MHz to 30 MHz. As a modulation method, an orthogonal frequency-division multiplexing (OFDM) method or a spread spectrum (SS) method can be used. First PLC circuit 113 performs high-speed power line communication conforming to a High Definition Power Line Communication (HD-PLC) (registered trademark) standard, for example. The HD-PLC (registered trademark) standard employs Wavelet OFDM/pulse amplitude modulation (PAM) as a modulation method, and time division multiple access (TDMA) carrier sense multiple access with collision avoidance (CSMA/CA) as a media access control method. Note that first PLC circuit 113 is not limited to the PLC modem that executes high-speed PLC communication, and may be a PLC modem that executes low-speed PLC communication using a band of 10 kHz to 450 kHz.

A first terminal of first PLC circuit 113 is connected to a positive-electrode terminal or a negative-electrode terminal of first battery unit B1 via first isolated circuit 114. A second terminal of first PLC circuit 113 is connected to a housing of first battery module 10a via first isolated circuit 114. The housing of first battery module 10a is a conductive housing (for example, metal housing). In the housing of first battery module 10a, the substrate of first management unit 11 is disposed in a non-contact state with the housing. The second terminal of first PLC circuit 113 is connected to the housing by wiring.

First isolated circuit 114 is a circuit that insulates in a direct current between first PLC circuit 113 and power line Pp, Pm and between first PLC circuit 113 and the housing. First isolated circuit 114 shown in FIG. 1 includes pulse transformer T1, and DC cut capacitors C1a, C2a. Both ends of a primary winding of pulse transformer T1 are respectively connected to the first terminal and the second terminal of first PLC circuit 113. One end of a secondary winding of pulse transformer T1 is connected to the negative-electrode terminal of first battery unit B1 via DC cut capacitor C1a, and the other end of the secondary winding of pulse transformer T1 is connected to the housing of first battery module 10a via DC cut capacitor C1b.

The circuit configuration of first isolated circuit 114 shown in FIG. 1 is an example, and may take any circuit configuration that passes an AC component of a frequency band used by first PLC circuit 113 and cuts off a DC component. For example, a photo-coupler may be used instead of the pulse transformer. Alternatively, only one of the pulse transformer or the DC cut capacitors may be used.

First processing circuit 112 manages first battery unit B1. Specifically, first processing circuit 112 uses power line communication to periodically (for example, every several hundred milliseconds to several seconds) notify main management unit 51 included in main management system 50 of battery information including a voltage, a current, and a temperature of each cell of first battery unit B1 obtained from first measuring circuit 111. First processing circuit 112 can be achieved by cooperation of hardware and software resources or hardware resources alone. As the hardware resources, microcomputers, read-only memories (ROMs), random-access memories (RAMs), digital signal processors (DSPs), field-programmable gate arrays (FPGAs), and other large-scale integrated circuits (LSIs) can be utilized. As the software resources, programs such as firmware can be utilized.

Second battery module 10b and third battery module 10c have the same configuration as first battery module 10a and thus explanations are omitted.

Main management system 50 includes positive-side switch Sp, negative-side switch Sm, and main management unit 51. Positive-side switch Sp is inserted into positive power line Pp, and negative-side switch Sm is inserted into negative power line Pm. Relays can be used as positive-side switch Sp and negative-side switch Sm. Semiconductor switches may be used instead of the relays. Positive-side switch Sp and negative-side switch Sm, in an off (open) state, can provide an electric cutoff between power conditioner system 60 and a plurality of battery units B1 to B3.

Main management unit 51 includes driving circuit 511, (main) processing circuit 512, (main) PLC circuit 513, and (main) isolated circuit 514. In the present exemplary embodiment, driving circuit 511, processing circuit 512, PLC circuit 513, and isolated circuit 514 are mounted on one substrate.

Driving circuit 511 performs on/off control of positive-side switch Sp and negative-side switch Sm based on a control signal from processing circuit 512. For example, when relays are used as positive-side switch Sp and negative-side switch Sm, driving circuit 511 generates a current to be applied to a relay coil.

A first terminal of PLC circuit 513 is connected via isolated circuit 514 to positive power line Pp at a downstream side from positive-side switch Sp, or negative power line Pm at a downstream side from negative-side switch Sm. A second terminal of PLC circuit 513 is connected via isolated circuit 514 to a housing of main management system 50. Isolated circuit 514 insulates in a direct current between PLC circuit 513 and power line Pp, Pm and between PLC circuit 513 and the housing.

Processing circuit 512 utilizes power line communication to collect battery information of battery units B1 to B3 respectively from battery modules 10a to 10c. Processing circuit 512 executes state-of-charge (SOC) management, state-of-health (SOH) management, and equalization control of the cells included in respective battery units B1 to B3, for example. Further, when detecting an occurrence of overcurrent, over-discharging, overcharging, or temperature abnormality, processing circuit 512 outputs a control signal of cutoff instructions for positive-side switch Sp and negative-side switch Sm to driving circuit 511.

Figure 2:
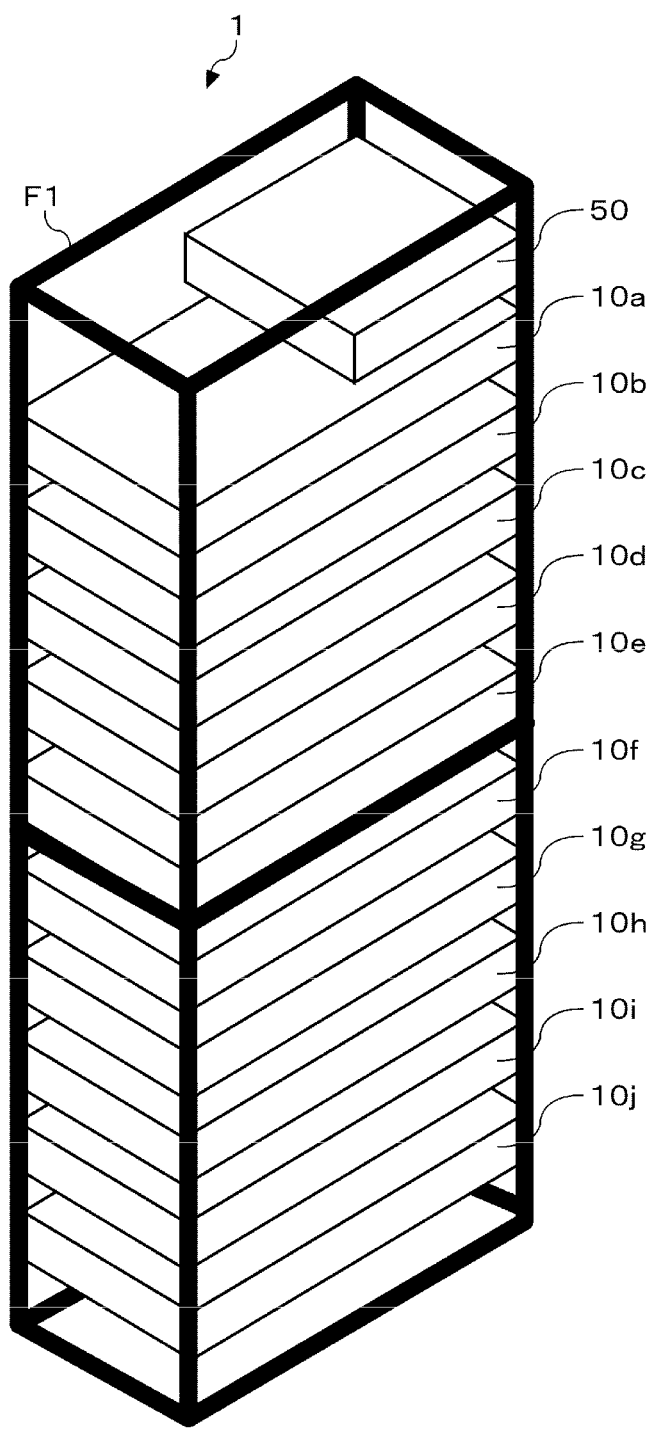
FIG. 2 is a schematic perspective view of an exterior configuration example of the battery system according to the exemplary embodiment of the present invention.

FIG. 2 is a schematic perspective view of an exterior configuration example of battery system 1 according to the exemplary embodiment of the present invention. The plurality of battery modules 10a to 10j and main management system 50 are stacked in rack frame F1 having a rectangular-parallelepiped shape to constitute battery system 1. Rack frame F1 is a conductive rack frame such as a metal frame, for example. The plurality of battery modules 10a to 10j and main management system 50 are housed in respective metal housings having a rectangular-parallelepiped shape. The housing of main management system 50 may house power conditioner system 60 together. The plurality of battery modules 10a to 10j and main management system 50 are electrically connected together by positive power line Pp and negative power line Pm arranged at a back surface.

In FIG. 2, the housings of the plurality of battery modules 10a to 10j and main management system 50 are arranged with respective intervening spaces. However, conductive rack frame F1 provides conduction between the housings of the plurality of battery modules 10a to 10j and main management system 50. Note that the housings of the plurality of battery modules 10a to 10j and main management system 50 may be stacked in contact with each other without the intervening spaces. Rack frame F1 or any of the housings of the battery modules is connected to the ground by a ground wire not shown.

When the housings of the plurality of battery modules 10a to 10j and main management system 50 are insulating housings (for example, resin housings), the second terminal of each PLC circuit of the plurality of battery modules 10a to 10j and main management system 50 is connected to a common ground wire.

Figure 3A:
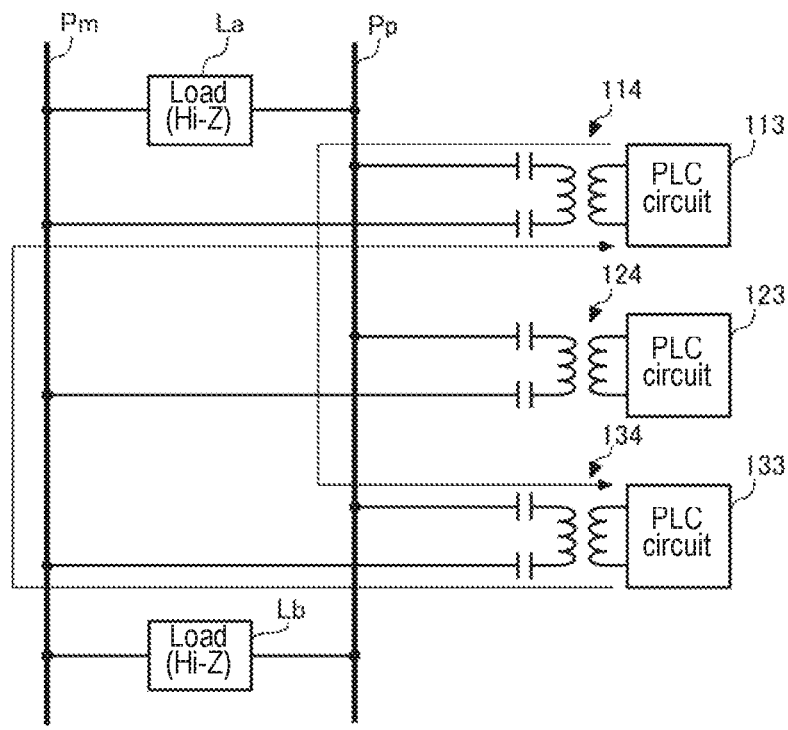
FIGS. 3A and 3B are views for explaining general nature of power line communication.
Figure 3B:
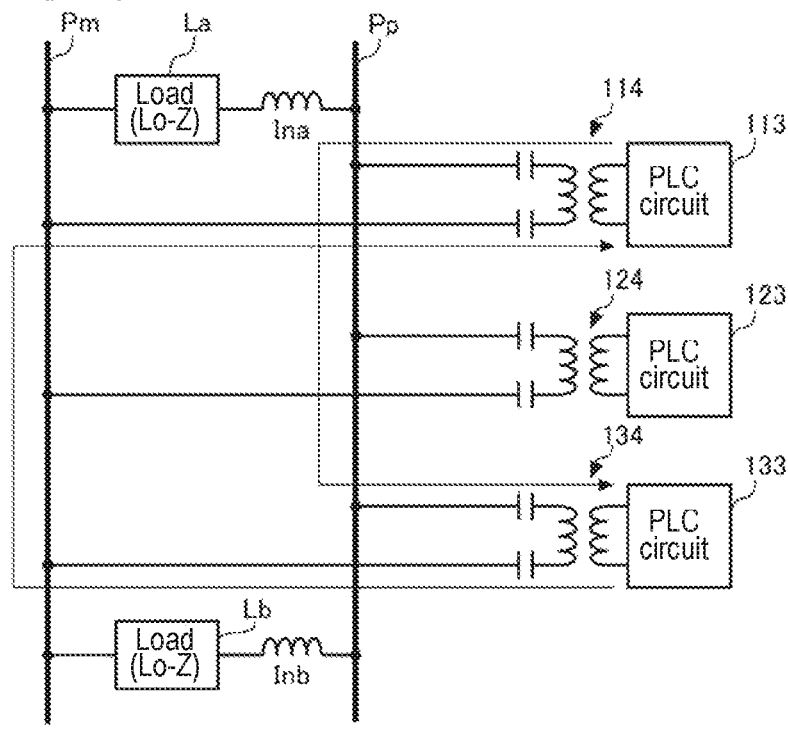

FIGS. 3A and 3B are views for explaining general nature of power line communication. In FIGS. 3A and 3B, a first terminal of first PLC circuit 113 is connected to positive power line Pp via first isolated circuit 114, and a second terminal of first PLC circuit 113 is connected to negative power line Pm via first isolated circuit 114. Second PLC circuit 123 and third PLC circuit 133 are each connected to positive power line Pp and negative power line Pm in a similar way. It is assumed hereinafter that data is transmitted from first PLC circuit 113 to third PLC circuit 133 by power line communication.

In FIG. 3A, loads La, Lb are connected between positive power line Pp and negative power line Pm. Loads La, Lb have high impedance in a frequency band used for power line communication. A signal having been transmitted from first PLC circuit 113 to positive power line Pp and negative power line Pm reaches third PLC circuit 133 without being absorbed by loads La, Lb having high impedance.

Meanwhile, when loads La, Lb have low impedance in the frequency band used for power line communication, a part of signal having been transmitted from first PLC circuit 113 to positive power line Pp and negative power line Pm is absorbed by loads La, Lb having low impedance. In this case, the signal having been transmitted from first PLC circuit 113 largely attenuates and then reaches third PLC circuit 133. When attenuation due to loads La, Lb having low impedance is large, the signal sometimes fails to reach third PLC circuit 133.

In FIG. 3B, impedance uppers Ina, Inb are respectively connected in series with loads La, Lb having low impedance. Impedance uppers Ina, Inb are elements that have high impedance in the frequency band used for power line communication, and are generally coils. This configuration can prevent a signal having been transmitted from first PLC circuit 113 from sneaking into loads La, Lb having low impedance, and suppress attenuation due to loads La, Lb.

Figure 4:
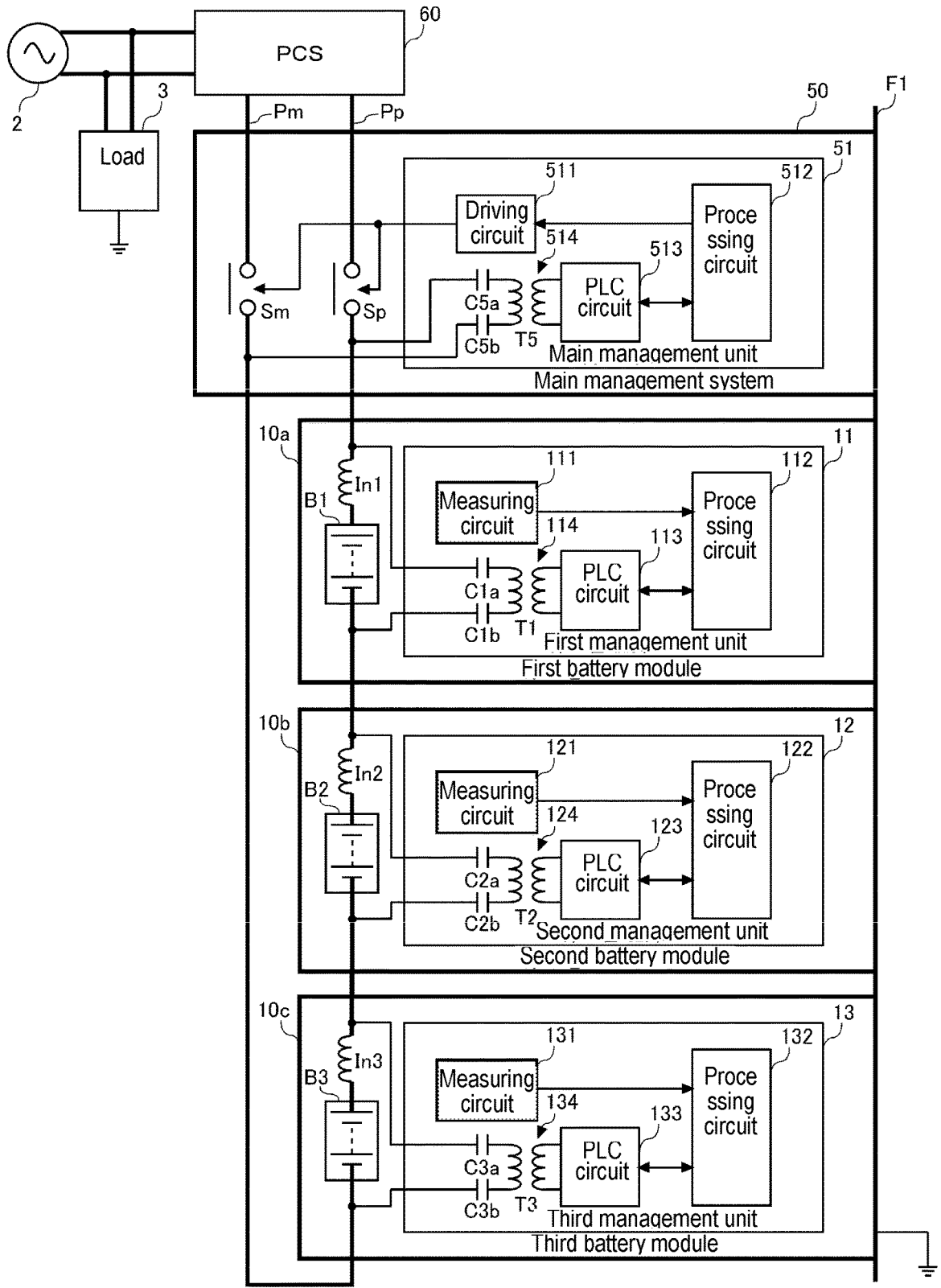
FIG. 4 is a view of a circuit configuration example of a battery system according to a comparative example.

FIG. 4 is a view of a circuit configuration example of battery system 1 according to a comparative example. In the comparative example, unlike the exemplary embodiment of the present invention shown in FIG. 1, a first terminal and a second terminal of first PLC circuit 113 are respectively connected to both ends (positive-electrode terminal and negative-electrode terminal) of first battery unit B1 via first isolated circuit 114. Second PLC circuit 123 and third PLC circuit 133 are respectively connected to both ends of second battery unit B2 and third battery unit B3 in a similar way.

In the circuit configuration shown in FIG. 4, first battery unit B1 that is a low-impedance load is connected between the first terminal and the second terminal of first PLC circuit 113 as in the circuit configurations of FIGS. 3A and 3B. Then, as shown in FIG. 3B, first impedance upper In1 is connected in series with first battery unit B1. This configuration can prevent a signal transmitted from first PLC circuit 113 from sneaking into first battery unit B1 and attenuating.

Similarly, second impedance upper In2 is connected in series with second battery unit B2, and third impedance upper In3 is connected in series with third battery unit B3. In this way, the signal having been transmitted from first PLC circuit 113 is to bypass second battery unit B2 and third battery unit B3 to reach PLC circuit 513 of main management system 50. Signals having been transmitted from second PLC circuit 123 and third PLC circuit 133 are to similarly reach PLC circuit 513 of main management system 50 without passing first battery unit B1 to third battery unit B3.

In the circuit configuration shown in FIG. 4, when a large current flows in power lines Pp, Pm, it is necessary to use impedance uppers In1 to In3 that are large in allowable current. Impedance uppers In1 to In3 that are large in allowable current are large in size and high in cost.

Meanwhile, in the circuit configuration according to the present exemplary embodiment shown in FIG. 1, the first terminal of first PLC circuit 113 is connected to power line Pp, Pm, and the second terminal of first PLC circuit 113 is connected to the conductive housing connected to the ground. No low-impedance load is connected between power line Pp, Pm and the housing, and a high-impedance state is realized between power line Pp, Pm and the housing. Therefore, signal attenuation due to a low-impedance load can be prevented.

Figure 5:
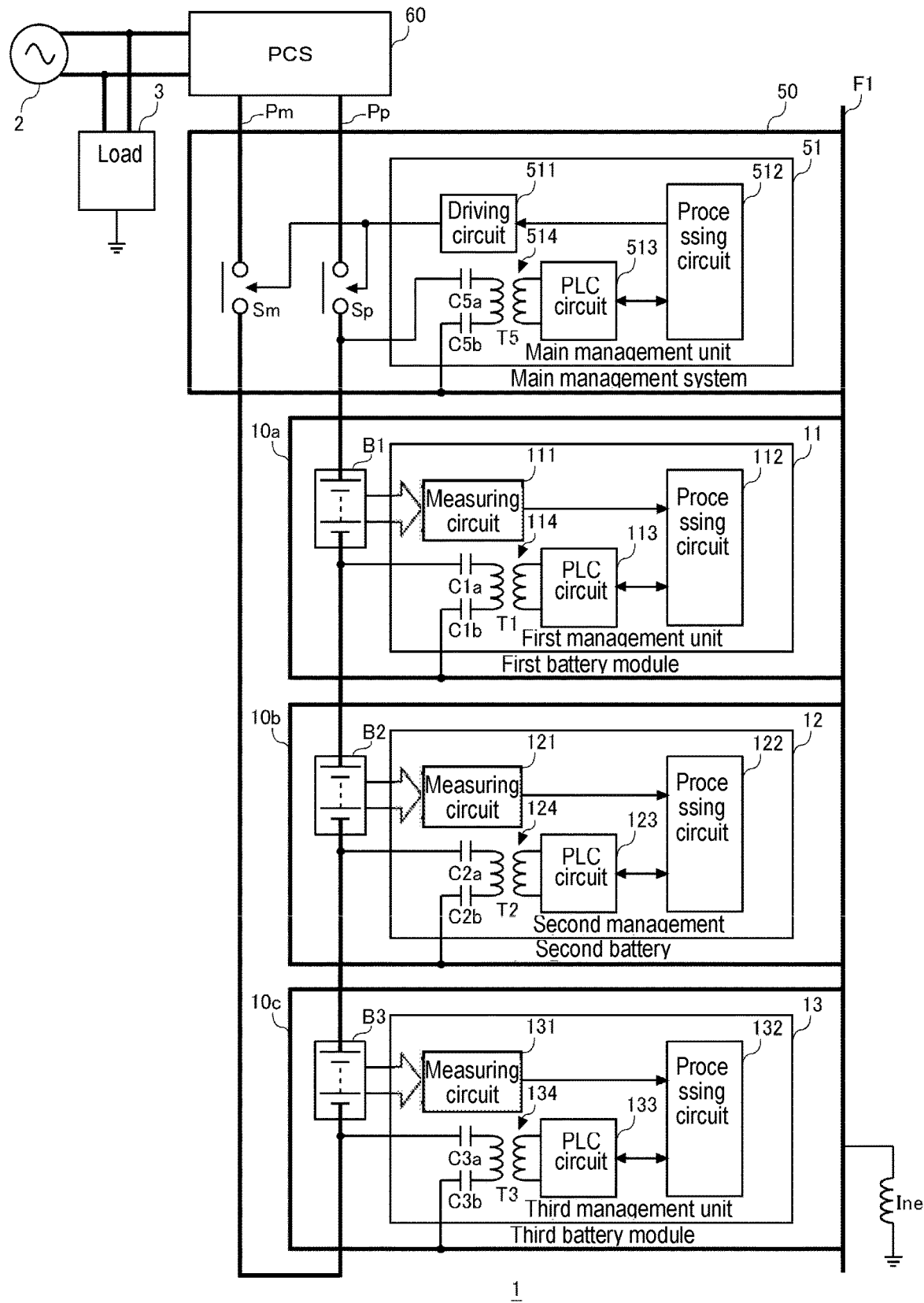
FIG. 5 is a view of a configuration having an impedance upper inserted between a housing of the battery system of FIG. 1 and a ground.

FIG. 5 is a view of a configuration having impedance upper Ine inserted between a housing of battery system 1 of FIG. 1 and the ground. In the configuration shown in FIG. 1, a high-frequency signal used for power line communication sometimes sneaks into another load via the ground as a high-frequency noise. Meanwhile, connecting impedance upper Ine between conductive rack frame F1 or housing and the ground can prevent the sneaking high-frequency noise.

Note that only a small current flows in the ground wire to which impedance upper Ine is connected. Therefore, it is possible to use impedance upper Ine that is small in allowable current, and thus small in size and cheap. On the other hand, since a large current flows in impedance uppers In1 to In3 shown in FIG. 4, it is necessary to use impedance uppers In1 to In3 that are large in size and expensive.

As described above, according to the present exemplary embodiment, using power line Pp, Pm and the conductive housing connected to the ground as communication media can reduce influence of impedance of battery units B1 to B3 and suppress attenuation of a communication signal due to battery units B1 to B3. Therefore, in battery system 1 with battery modules 10a to 10c having low impedance, power line communication with high reliability can be achieved.

Battery system 1 according to the present exemplary embodiment does not require battery units B1 to B3 to be connected to impedance uppers In1 to In3, respectively. Further, a high-cost ferrite core is also unnecessary and using a low-cost pulse transformer and/or a DC cut capacitor is sufficient. Therefore, power line communication at low cost with high reliability can be achieved.

Battery system 1 according to the present exemplary embodiment is particularly effective for battery system 1 in which a large current flows. Battery system 1 in which a large current flows, in the case that only the power line is used as a communication medium, requires high-cost components such as an impedance upper for large current and a ferrite core. In this regard, battery system 1 according to the present exemplary embodiment does not require such high-cost components.

Further, battery system 1 according to the present exemplary embodiment does not require a dedicated communication line and a ground wire linking the housings together. Therefore, outside wiring of battery system 1 becomes simple and installation work becomes easy. Design is also improved.

The present invention has been described above based on the exemplary embodiment. The person of ordinary skill in the art will comprehend that the exemplary embodiment is an example, the combination of the configuration elements and the processing processes can be modified in various ways, and such modified examples are also included in the scope of the present invention.

The above exemplary embodiment exemplifies battery system 1 configured with the plurality of battery units B1 to B3 connected in series. In this regard, the present invention is also applicable to battery system 1 having a plurality of battery units B1 to B3 connected in parallel. In the parallel-connection configuration, when each end of a PLC circuit is connected to each end of the battery units via an isolated circuit, influence of the low-impedance loads becomes larger. Thus, the technique of connecting both ends of a PLC circuit respectively to a power line and a grounding potential according to the present exemplary embodiment is effective.

In the above exemplary embodiment, a power storage system is assumed as battery system 1. However, battery system 1 is also applicable to a vehicle battery system. In the case of a vehicle battery system, power conditioner system 60 is replaced with an inverter, and load 3 is replaced with a running motor. Power system 2 is connected via a cable during parking.

Battery system 1 according to the above exemplary embodiment is also applicable to a photovoltaic system. A photovoltaic module having a plurality of photovoltaic cells connected in series is also a low-impedance load. Thus, the technique according to the above exemplary embodiment is effective. For example, the technique can be used in the case that a management unit arranged per string uses power line communication to notify a main management unit of information on the photovoltaic cells.

Further, the above exemplary embodiment exemplifies the grounded housings of the plurality of battery modules 10a to 10j. In this regard, the housings of the plurality of battery modules 10a to 10j may be connected to a fixed potential other than the ground. For example, a negative potential generated by a DC/DC convertor not shown may be applied to the housings. In this case, the negative potential is a common potential of the plurality of battery modules 10a to 10j.

The exemplary embodiment may be specified by items described below.

[Item 1]

Battery system (1) including a plurality of battery modules (10a to 10c),
wherein each of battery modules (10a to 10c) includes:
battery unit (B1 to B3) connected to power line (Pp, Pm);
processing circuit (112 to 132) configured to manage battery unit (B1 to B3);
communication circuit (113 to 133) configured to communicate data to be transmitted or received by processing circuit (112 to 132); and
isolated circuit (114 to 134) configured to insulate in a direct current between a first terminal of communication circuit (113 to 133) and a positive-electrode terminal or a negative-electrode terminal of battery unit (B1 to B3), and between a second terminal of communication circuit (113 to 133) and a conductive body to be a common potential of the plurality of battery modules (10a to 10c) except for power line (Pp, Pm).

This can achieve power line communication at low cost with high reliability.

[Item 2]

Battery system (1) according to item 1, wherein the conductive body is a conductive housing of the plurality of battery modules (10a to 10c).

This allows a ground wire that connects the plurality of battery modules (10a to 10c) together to be omitted.

[Item 3]

Battery system (1) according to item 1 or 2, wherein the conductive body is connected to a ground,
battery system (1) further including impedance upper (Ine) inserted between the conductive body and the ground.

This can prevent a power line communication signal from sneaking via the ground.

[Item 4]

Battery system (1) according to any one of items 1 to 3, further including:
processing circuit (512) configured to control switch (Sp, Sm) connected between the plurality of battery modules (10a to 10c) and load (3);
communication circuit (513) configured to communicate data to be transmitted or received by processing circuit (512); and
isolated circuit (514) configured to insulate in a direct current between a first terminal of communication circuit (513) and power line (Pp, Pm), and between a second terminal of communication circuit (513) and the conductive body,
wherein processing circuit (112 to 132) configured to manage battery unit (B1 to B3) transfers state data of battery unit (B1 to B3 C) via power line (Pp, Pm) and the conductive body to processing circuit (512) configured to control switch (Sp, Sm).

This can achieve control of switch (Sp, Sm) depending on a state of battery unit (B1 to B3) by utilizing power line communication.

[Item 5]

Battery system (1) according to any one of items 1 to 4, wherein a plurality of battery units (B1 to B3) of the plurality of battery modules (10a to 10c) are connected in series.

This can achieve power line communication at low cost with high reliability in battery system (1) having power lines (Pp, Pm) subject to large current.

The invention claimed is:

1. A battery system comprising:
a plurality of battery modules; and
a management system,
wherein each of the battery modules includes:
a battery unit connected to a power line;
a first processing circuit configured to manage the battery unit;
a first communication circuit configured to communicate data to be transmitted or received by the first processing circuit; and
a first isolating circuit configured to limit flow of a direct current between a first terminal of the first communication circuit and a positive-electrode terminal or a negative-electrode terminal of the battery unit, and between a second terminal of the first communication circuit and a common potential of the plurality of battery modules except for the power line, wherein the management system includes:
- a second processing circuit configured to collect battery information of the battery modules,
- a second communication circuit configured to communicate data that is transmitted or received by the second processing circuit, and
- a second isolating circuit configured to limit flow of a direct current between a first terminal of the second communication circuit and the power line, and between a second terminal of the second communication circuit and the common potential, and wherein the management system communicates the data transmitted from the first communication circuit to the second communication circuit via the power line.

2. The battery system according to claim 1, wherein the common potential is a conductive housing of the plurality of battery modules.

3. The battery system according to claim 1, wherein the common potential is connected to a ground, and
the battery system further comprises an impedance upper inserted between the common potential and the ground.

4. The battery system according to claim 1,
wherein the second processing circuit is configured to control a switch connected between the plurality of battery modules and a load, and
wherein the first processing circuit is configured to transfer state data of the battery unit via the power line and the common potential to the second processing circuit.

5. The battery system according to claim 1, wherein the battery units of the plurality of battery modules are connected in series.

* * * * *